April 28, 1931.  J. KNIGHT  1,802,899
UNIVERSAL JOINT OR COUPLING
Filed April 8, 1929
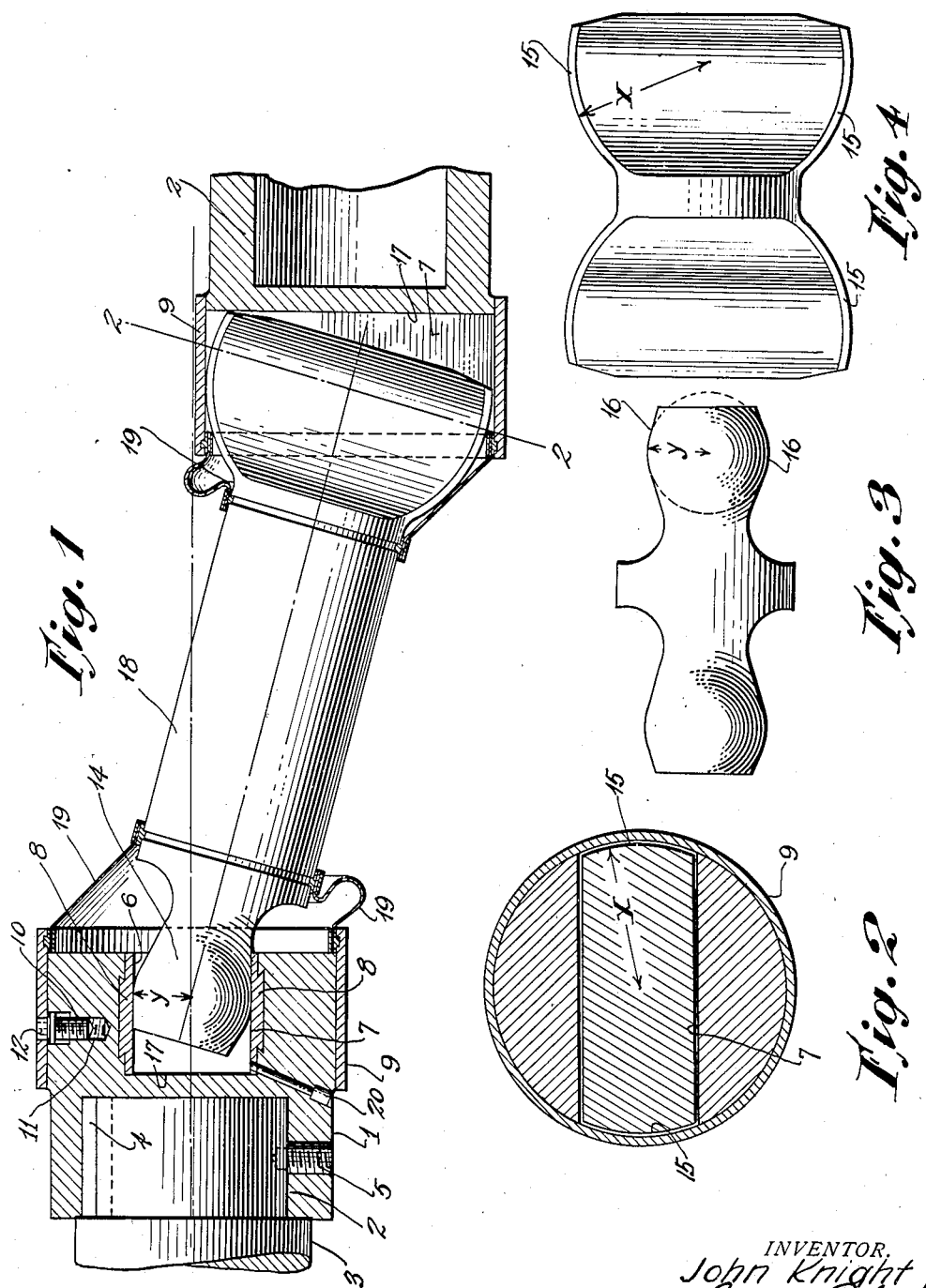
INVENTOR,
John Knight
BY
ATTORNEYS.

Patented Apr. 28, 1931

1,802,899

UNITED STATES PATENT OFFICE

JOHN KNIGHT, OF ROCKAWAY, NEW JERSEY, ASSIGNOR, BY MESNE ASSIGNMENTS, OF ONE-HALF TO THOMAS GORDON HOAGLAND, OF ROCKAWAY, NEW JERSEY

UNIVERSAL JOINT OR COUPLING

Application filed April 8, 1929. Serial No. 353,440.

This invention relates to universal joints or couplings, the latter of which are particularly designed for use in connection with the driving of rolling mill rolls or the like, although they are susceptible of employment in any of the several arts where couplings are employed and one universal joint assembly of the structure is well adapted for use as a universal joint in any environment where such joints are desirable.

Numerous joint and coupling structures have heretofore been suggested for widely varying purposes. Some are primarily intended for relatively low power transmission, while other are designed for the transmission of relatively great power.

The present invention may be used to transmit either much or little power depending upon the mass of the material employed and the character of such material, but it is entirely feasible to make the joint of this invention so as to transmit practically unlimited power.

The object of the present invention, generally speaking, is to produce such a joint and coupling which will be capable of transmitting great power and yet which will be unusually simple and economical to manufacture. Heretofore so-called "heavy duty" universal joints and couplings have been so complicated that their manufacture is extremely costly.

The present invention aims to produce and accomplishes a joint and coupling structure of unusual simplicity combined with unusual strength. This combination of features marks a pronounced advance in the art to which the present invention pertains.

The joint of this invention embodies in a generic sense what may be termed male and female elements. The female element is in the form of a straight sided slot, i. e., a slot wherein the opposite sides thereof are parallel to one another and extend in parallel relation to a plane extending through the axis of rotation of such member. The slot is cut into the end of said member and the blind end or base of the slot may be made perfectly flat. The side faces of the slot constitute the wearing faces and may be provided with detachable wearing plates. The advantage of the flat sided and flat based slot construction is that the slot may be rendered true to the desired dimension by one of the simplest form of cutting and grinding operations, whereby the female member can be produced at a minimum expense.

The male member of the joint is in the form of a relatively wide transversely flat projection adapted to extend into the slot with a nice working fit and those portions of the male member which engage with the side faces of the slot during the operation of the joint are curved on the arc of a circle, the radius of which is substantially equal to one half the height of the slot, so that the portion of the male member which coacts with the walls of the slot is, in effect, cylindrical and the male projection may be referred to as embodying a cylindrical part fitted into the slot of the female member for articulation in a direction perpendicular to the side walls of the slot. The ends of the slot are adapted to be closed by a sleeve slidable longitudinally of the female member and adapted to be locked in place in any suitable manner. The edge faces of the male member are curved on a radius substantially equal to half the width of the slot, so as to articulate with the interior faces of the sleeve at the ends of the slot. The end of the male member may be curved to articulate with the blind end of the slot although this is not necessary.

In the joint of this invention, there is a floating relation between the male and female members and at the same time a close working fit precluding lost motion in any direction which would result in noise, wear or faulty operation.

Two joints of the character referred to may form a close coupling between two adjacent shafts or roll ends or a shaft and a roll end or between any two other rotatable parts which it is desired to couple together for simultaneous movement on non co-axial axes. Moreover, the male members of two joints may be associated with the opposite ends of a spindle and said male members may cooperate with female members mounted on the parts which it is desired to simultaneously rotate one from the other.

Features of the invention, other than those adverted to, will be apparent from the hereinafter detailed description and claim, when read in conjunction with the accompanying drawings.

The accompanying drawing illustrates different practical embodiments of the invention, but the constructions shown therein are to be understood as illustrative, only, and not as defining the limits of the invention.

Figure 1 shows a coupling embodying the present invention, partly in section and partly in elevation.

Figure 2 is a section on the line 2—2 of Figure 1.

Figure 3 is a side elevation of a coupling element of slightly different form than illustrated in Figure 1; and, Figure 4 is a face view of the element illustrated in Figure 3.

In Figure 1 of the drawings, two universal joints are shown as spaced apart by an interposed strut at the opposite ends of which are carried male projections positioned at right angles to one another. In Figures 3 and 4, the male elements are the same as in Figure 1, but the strut element is made very short in order to produce a close coupling and the male elements are positioned in parallel relation instead of at right angles to one another, otherwise the structures of the several figures correspond to one another.

Each female element is shown as comprising a cylindrical part 1, chambered at 2 to receive one end of a shaft or roll spindle, such as designated 3 which is reduced and fitted into the chamber 2 and secured against rotation therein by a key 4. A set screw 5 secures the part 1 in place against inadvertent displacement with respect to the shaft on which it is mounted. The assembly with respect to the shaft 3 is duplicated for the shaft associated with the other female element.

Extending cross axially with respect to the free end of the cylindrical female element is a slot, the side walls 6 and 7 of which are parallel to one another and are spaced in equidistant parallel relation from a plane passed through the axis of rotation of the corresponding shaft. The surfaces 5 and 6 may be formed directly within the part 1 or may be formed on wearing plates 8 dove tailed to the part 1, so as to be slid in from the ends of the slot. These wearing plates may be made of any suitable material to render them susceptible of withstanding wear. The slot extends cross axially throughout the entire diameter of the part 1, and the end thereof is adapted to be normally closed by a sleeve 9 which is slidable on the outer periphery of said part, when in the position shown in Figure 1, the forward end of the sleeve serves to close the opposite ends of the slot, but this sleeve may be slid in either direction from the other out of registration with the ends of the slot. The sleeve may be normally locked in position by means of a set screw 10 which when fully screwed into a tapped hole 11 will permit of longitudinal movement of the sleeve, but when screwed outwardly will cause a projection 12 on the screw to enter a perforation in the sleeve and lock the sleeve against movement.

The male element is designated in the drawings generally by the reference character 14. It is of what may be termed a composite shape and consists, in the main, of a diametric cylindrical section of a sphere. This will be apparent from the several views of the drawings. For example, by reference to Figure 4, it will be noted that the faces 15, as viewed in such figure, are curved on a radius $x$, while by reference to Figure 2, it will be noted that the same faces 15, as viewed in this figure, are also curved on the same radius $x$. These faces constitute portions of a spherical surface having the radius $x$ and this radius $x$ is equal to the radius of the cylindrical element 1, i. e., the inner radius of the sleeve 9. This fact will permit the surfaces 15, as viewed in Figure 4, to articulate with the inner face of the sleeve 9 in the manner indicated in the right hand joint in Figure 1, so as to permit change of angular relation between the axis of the male member and the axis of the female member. By reference to Figure 2, it will be noted that the curvature of the surfaces 15 will adapt them for cooperation with the inner surface of the sleeve 9.

It thus appears that the surfaces 15 are sections of the surface of the sphere.

Now by reference to Figure 3, it will be noted that the surfaces 16 form a portion of the surface of a cylinder having the radius $y$ which is equal in dimension to one half the height of the slot of the female member as will be clearly apparent in the joint at the left hand in Figure 1. As the universal joint is intended to function only within predetermined variations of angular deviation, only a corresponding portion of the surface of the cylinder referred to will be required for cooperation with the faces 6 and 7 of the female member, and consequently the member is shaped adjacent such portions so as to be tangent thereto in order to impart maximum strength. It is thus apparent that the male element embodies in effect a cylindrical section, the opposite end surfaces of which constitute portions of a spherical surface.

The parts are machined as to function with a nice working fit free from undue clearance or lost motion, and when thus manufactured, the male and female parts will articulate to transmit power in a manner which will be clearly understood by those skilled in the art. The end of the male member may be curved to bear against the base surface 17 of the slot, although this is not essential as longitudinal movement of the parts with respect to one another will not interfere with their proper driving and driven relation.

In Figure 1, two male members are shown as carried by the opposite ends of a relatively long spindle or connecting element 18, and said members are shown as positioned at right angles to one another. If desired, however, the members may be positioned parallel to one another as shown in Figures 3 and 4, and, conversely, the structures of Figures 3 and 4 may be elongated by the interposition between the male members of a spindle of any desired length.

If desired, a boot 19 may be associated with each universal joint after the manner shown in Figure 1 or in any other suitable way so as to permit the parts to operate within a bath of lubricant which may be supplied through an oil grease duct 20 having appropriate fittings.

The invention manifestly embodies numerous novel features which are of pronounced practical importance. One of the most important features is inherent in the marked simplicity of the device and the economy with which it may be manufactured. The parts are of such simple geometrical form that they may be machined with great nicety and precision without the employment of special machinery and the relation of these parts is such that wear will be minimized.

Another important practical advantage will be apparent from Figure 2, wherein it will be seen that the driving torque is distributed throughout substantially the entire diameter of the male and female members and with such an arrangement slight wear or looseness between the cooperating parts will not in any wise affect the operation of these parts or render them noisy. It is worthy of note also that the bearing surfaces between the respective elements are of unusually large extent and this also serves to minimize wear, while, nevertheless, there is but line contact between the surfaces 16 and the surfaces 6 and 7 and consequently friction is practically negligible.

I wish it also understood that wearing plates may be associated with those portions of the sleeve 9 which are juxtaposed with the opposite ends of the slot in the female member and these plates may be associated with the sleeve in the same manner as the wearing plates 8 are associated with the part 1 and for the same purpose.

The foregoing detailed description sets forth the invention in its preferred practical form, but the invention is to be understood as fully commensurate with the appended claim.

Having thus fully described the invention, what I claim as new and desire to secure by Letters Patent is:

A universal joint or coupling comprising a female member provided with a cross axial slot having parallel side walls, and a male member embodying, in a one piece, integral part, a diametric solid cylindrical section of a solid spherical body, the diameter of the solid cylindrical section being approximately equal to the distance between the side walls of the slot and the diameter of the solid spherical body being approximately equal to the width of said slot, whereby the male member is adapted to directly engage with and articulate with respect to the walls of the slot of the female member.

In testimony whereof I have signed the foregoing specification.

JOHN KNIGHT.